United States Patent [19]

Burkhalter et al.

[11] 4,450,010

[45] May 22, 1984

[54] WELL CEMENTING PROCESS AND GASIFIED CEMENTS USEFUL THEREIN

[75] Inventors: John F. Burkhalter; Jerry D. Childs; David L. Sutton, all of Duncan, Okla.

[73] Assignee: Halliburton Company, Duncan, Okla.

[21] Appl. No.: 489,909

[22] Filed: Apr. 29, 1983

[51] Int. Cl.$^3$ .......................... C04B 7/35; C04B 21/02
[52] U.S. Cl. ........................................ 106/87; 166/293
[58] Field of Search .......................... 106/87; 166/293

[56] References Cited

U.S. PATENT DOCUMENTS

| | | | |
|---|---|---|---|
| 3,591,394 | 7/1971 | Diggelman et al. | 106/87 |
| 4,142,909 | 3/1979 | Gaines | 106/87 |
| 4,304,298 | 12/1981 | Sutton | 106/87 |
| 4,333,764 | 6/1982 | Richardson | 106/87 |
| 4,340,427 | 7/1982 | Sutton | 106/87 |
| 4,367,093 | 1/1983 | Burkhalter et al. | 106/87 |

*Primary Examiner*—James Poer
*Attorney, Agent, or Firm*—Thomas R. Weaver; Edward F. Sherer

[57] ABSTRACT

A composition for a method of cementing subterranean formations. The cementing composition comprises hydraulic cement, a nitrogen gas generating material, an oxidizing agent, and a reaction rate control material. The concentration of the nitrogen gas generating material is correlated with the pressure and temperature of the cement zone to be cemented so that the flow of gas from the formation into the borehole is suppressed or controlled.

20 Claims, No Drawings

WELL CEMENTING PROCESS AND GASIFIED CEMENTS USEFUL THEREIN

BACKGROUND OF THE INVENTION

1. Field of the Invention

The present invention relates to cement compositions, and more particularly to the use of hydraulic cement compositions for sealing or cementing subterranean zones penetrated by a borehole, such as cementing the annular space between an oil and/or gas well casing and the surrounding formation. In particular, the invention relates to an improved hydraulic cement slurry in which a stabilized and dispersed gas is generated at a controlled rate for cementing zones which contain gas or fluid under pressure, so that emission and flow of gas or fluid from the formation into the borehole or well annulus is suppressed or controlled by the counteractive pressure resulting from the inclusion of gas in the cement slurry prior to the time that the cement composition sets to a hardened state.

2. Description of the Prior Art

In the production of hydrocarbons from a subterranean formation, the subterranean formations are typically cemented or sealed by pumping an aqueous hydraulic cement slurry into the annulus between the pipe and the formation. In the oft practiced placement of cement in the annular space between the casing of an oil well and the surrounding subterranean formation, the cement slurry is commonly pumped into the casing and back up the annular space outside the casing. Occasionally, the cement is introduced directly to the annular space at the outer side of the casing. Where the cement has been pumped down the casing initially, any cement slurry which remains in the casing is displaced into the annulus by a suitable fluid or fluids.

On some occasions, the zones adjacent the cement containing annulus contain connate gas under substantial pressure. In these instances, an undesirable phenomenon referred to in the art as gas leakage is sometimes encountered in which the formation gas enters the annular space which surrounds the well casing after the primary cementing slurry has been placed. This gas can migrate to the surface, or other subterranean zones, through the annulus and the cement, forming a permanent flow channel or a highly permeable cement, and the leakage of such gas continues even after the cement slurry has taken a final set. Such gas leakage is detrimental to the long term integrity and sealing efficiency of the cement in the annulus, and the magnitude of such leakage is often enough to require an expensive remedial squeeze cementing job to be carried out to suppress or stop the gas leakage. Such gas leakage can cause high volume blow-outs shortly after the cement placement and before the cement has initially set.

Gas leakage occurs even though the initial hydrostatic pressure throughout the column of the cement slurry placed in the annulus far exceeds the pressure of gas in the formation from which the leaking gas originates. In explanation, it is theorized that two different well bore conditions can occur which will allow gas entry into the annulus. The first condition which is believed to be a prerequisite for annular fluid-gas migration is gellation of the cement slurry and subsequent development of static gel strength. This condition starts shortly after the cement slurry becomes static. The pressure required to move the cement is then directly related to the column length and the static gel strength. Thus as static gel strength increases, there is a loss of ability to transmit hydrostatic pressure.

The second condition which contributes directly to the loss of pressure in the cement column (and across the pressurized gas zone) is the loss of fluid and volume reduction within the cement column. This condition is believed to be due to the leak-off of water in the cement into the formations and from cement volume reduction due to chemical hydration.

Volume reductions occurring after static gel strength starts to develop results in a loss of pressure in the cement column. As the pressure in the cement column drops below the gas pressure, gas will enter the annulus. If at this time the static gel strength is still below the gas percolation value, a gas leakage condition is created.

Interestingly, the gelled or partially set cement, although it is incapable of maintaining or transmitting full hydrostatic pressure, still is not sufficiently rigid or set to prevent the entry of gas into the annulus and the upward percolation of the gas. According to the most popular theories, an absolute volume reduction occurring after the cement column can no longer transmit full pressure reduces the pore pressure of the still semi-plastic slurry. When the pore pressure falls below the formation gas pressure, formation gas leaks into the well bore and if the cement is not gelled enough to prevent percolation, gel leakage channels are formed. Two principal mechanisms which act to decrease the pore pressure are the hydration reaction of cement and the loss of filtrate to the adjacent permeable formation.

Gas leakage problems have been noticed following casing cementing operations on surface conductors and intermediate, production, and liner jobs. Gas returns to the surface have often been noticed within one to seven hours after placement of the cement. Many times, however, the gas flow does not return to the surface, but flows into low pressure zones causing interzonal gas communication.

In U.S. Pat. Nos. 4,304,298, and 4,340,427, which are assigned to the assignee of the present application and are herein incorporated by reference, in an effort to prevent gas leakage, the use of a cement slurry containing a stabilized, dispersed gas is described. Enough gas is present in the cement slurry of this invention to prevent gas under pressure from passing into or around the cement prior to the time the cement has set or gelled sufficiently to prevent percolation. The entrained gas, by virtue of its compressibility, reduces the magnitude of the pressure decrease resulting from the slurry volume reduction.

In U.S. Pat. No. 4,367,093, which is also assigned to the assignee of the present application and is herein incorporated by reference, a composition and method for cementing adjacent to a subterranean formation is disclosed. The cementing composition of the invention comprises a hydraulic cement, aluminum powder to generate hydrogen gas, and an inhibitor which retards the generation of hydrogen gas produced by the aluminum powder.

SUMMARY OF THE INVENTION

The present invention provides a cement composition and method of cementing a subterranean formation whereby the cement contains compositions which generate nitrogen gas. The generation of the gas in the cement controls the emission and flow of gas from the formation into the borehole or well annulus. The gas generating compositions comprise a nitrogen generating material, an oxidizing agent, and a reaction rate control material.

The concentration of the gas generating compositions in the cement slurry is correlated with the pressure and temperature of the cement zone to be cemented so that the flow of gas from the formation into the borehole or well annulus is suppressed or controlled by the gas in the cement slurry.

DETAILED DESCRIPTION OF THE INVENTION

The cement composition of the present invention comprises an aqueous hydraulic cement and a gas generating composition. The gas generating composition is selected from the group consisting of:

I. a nitrogen gas generating material selected from the group consisting of hydrazine, hydrazine sulfate, carbazide, and mixtures thereof;
an oxidizing agent selected from the group consisting of hydrogen peroxide, sodium peroxyborate tetrahydrate, sodium peroxyborate monohydrate, potassium dichromate, and mixtures thereof; and
a reaction rate control material selected from the group consisting of sodium sulfate, calcium sulfate hemihydrate, copper sulfate hemihydrate, copper sulfate, calcium hydroxide, and mixtures thereof;
II. a nitrogen gas generating material selected from the group consisting of hydrazine, hydrazine sulfate, carbazide, and mixtures thereof;
an oxidizing agent selected from the group consisting of calcium peroxide, zinc peroxide, and mixtures thereof; and,
a reaction rate control material comprising copper sulfate;
III. a nitrogen gas generating material selected from the group consisting of an ammonium salt of an organic or inorganic acid, hydroxylamine sulfate, carbamide, azodicarbonamide, and mixtures thereof;
an oxidizing agent selected from the group consisting of hydrogen peroxide, sodium peroxyborate tetrahydrate, sodium peroxyborate monohydrate, and mixtures thereof;
a reaction rate control material comprising copper sulfate; and,
IV. a nitrogen gas generating material comprising azodicarbonamide;
an oxidizing agent comprising calcium peroxide; and,
a reaction rate control material comprising copper sulfate; and,
V. mixtures of I, II, III, or IV.

Furthermore, a fluid loss additive can be added to the above-described cement composition. The principles of the invention are applicable not only to oil and/or gas wells, but also to water wells and even to fluid conveyance pipelines laid in or penetrating the earth.

Where terms such as "set time" and other nomenclature conventionally employed in the oil well cementing terminology are utilized, further clarification as to the connotations thereof is available from Bulletin 10-C of the American Petroleum Institute, which is incorporated herein by reference.

"Stable volume" is defined as a volume of gas at inplace conditions after the water phase is saturated with dissolved gas and any reactions between the generated gas and other slurry components are essentially complete and significant reduction in gas volume has occurred due to loss of gas volume to permeable formations. To result in a stable volume of gas, the generated gas must have limited solubility in the water phase of the cement slurry, and the gas must not liquify at in-place temperature and pressure conditions. "Useful volume" is defined as at least 0.10 SCF/CF of the slurry without gas, or the amount of gas needed to affect an in-place compressibility increase of at least 25% over the in-place compressibility of the slurry without gas.

Examples of ammonium salts of inorganic and organic acids which can be used in the practice of the invention include ammonium halogens, such as ammonium fluoride, ammonium chloride, and ammonium bromide, and other salts such as ammonium nitrate, ammonium sulfate, ammonium acetate, and ammonium formate.

The preferred gas generating composition comprises ammonium nitrate, sodium peroxyborate tetrahydrate, and copper sulfate. When this composition results in excessive retardation of the cement, a mixture of azodicarbonamide, calcium oxide, and copper sulfate is preferred.

The actual compressibility increase needed for a specific job is estimated from a preparatory computed program which uses the gas pressure and depth of the gas zone, length of cement volume, length of mud column above the cement, cement density, mud density, hole size, casing size, cement slurry properties and downhole condition of fluid loss. For the purpose of this invention, the gas generating composition should be incorporated into the cement composition in an amount sufficient to increase the compressibility under downhole conditions by at least 25% in relation to the initial compressibility of the same cement slurry not containing the gas generating composition. To accomplish this, the slurry should contain at least 0.1 SCF of stabilized entrained gas per cubic foot of slurry with the amount of gas increasing with well depth. In terms of actual downhole volumetric amount of gas included in the slurry, this will generally be from about 0.1 volume percent up to about 50 volume percent, with the actual amount depending upon the temperature and pressure conditions prevailing in the well, and to the lesser extent of other additives which are used in the slurry.

With nitrogen, it is possible to estimate the amount of gas which must be included in the cement slurry in order to produce a 25% increase in compressibility over that which characterizes the slurry without included gas. Such estimation is accomplished using the equations:

USC = Unreacted Slurry Compressibility
RSC = Reacted Slurry Compressibility at downhole condition.
VGH = Volume of Gas at downhole pressure before pressure loss.
PH = Downhole pressure before pressure loss
PL = Downhole pressure after pressure loss
PVH = Pressure Volume product for downhole condition before pressure loss.
PVL = Pressure Volume product for downhole conditions after pressure loss.
Both PVH and PVL based on PV at standard condition = 1,000.
EGC = Effective Gas Compressibility between PH and PL.
$RSC = (1 - VGH) \times (USC) + (EGC \times VGH)$
For a 25% increase in compressibility.

RSC = 1.25 USC
   1.25 USC = USC − USC × VGH + EGC × VGH
   USC(1.25 − 1) = VGH(EGC − USC)
   VGH = 0.25 USC/(EGC − USC)
An approximate equation for USC in $psi^{-1}$
   USC = (WV/TSV) × 2.8 × $10^{-6}$ − 0.06
   2.8 × $10^{-6}$ − 0.06 = approximate compressibility for water
WV = Water Volume in slurry
TSV = Total Slurry Volume
EGC = ΔV/V ÷ ΔP
Where
ΔV = (PCL/PL) − (PVH/PH)
V = ½[(PVL/PL) + (PVH/PH)]
OP = PH − PL.
What is required to estimate the gas needed for any specified increase in compressibility is:
  (1) WV, TSV, PH, PL which are specific values for a specific application.
  (2) PVH and PVL which are obtained from standard tables for the type of gas generated.
Once the VGH is detemined, the standard volume of gas needed is calculated from
SVG = VGH × (PH/PS) × (PVS/PVH)
PVS = Pressure Volume produced at standard conditions
PS = Standard Pressure
The amount of gas generating composition is then estimated from:
GG/VUS = (SVG − SMV) × EQW × (100/RE)
Where
GG = weight of Gas Generator
VUS = Volume of Unreacted Slurry
SVG = Standard Volume of Gas calculated
SMV = Standard Mole Volume
EQW = Equivalent mole weight of generator for one mole of gas.
RE = Reaction Efficiency for the gas generator.

In order to maintain hydrostatic pressure by in situ generation of gas within the slurry, or preliminary introduction of gas, it has been found to be very desirable to use some form of fluid loss control means in the slurry, otherwise the gas volumes required to maintain hydrostatic pressure are excessive. In some instances, an agent should also be present for aiding in dispersing and stabilizing the generated gas.

Many materials are known which reduce the amount and rate of fluid loss from the slurry after it has been placed in the annulus. Other additives to oil well cements which are principally used for other reasons, such as retardation or dispersing agents, also demonstrate, in some cases, some capacity for reducing fluid loss. A widely used measure of fluid loss from cement slurry is a standard API fluid loss test (API RP 10B, which is incorporated herein by reference), by which, under standard conditions, the amount of slurry filtrate which will pass through a standard screen of standard surface area in a given time is determined. The cement compositions of the present invention, when used in the process of this invention, are caused, either by the inclusion of an internal fluid loss control means or by external conditions hereinafter described, to yield a fluid loss value of less than 1000 cc in 30 minutes under such API test conditions (325 mesh screen, 1000 psi) and at a temperature of 100° F. Preferably, the type and amount of additive used are such that not more than 850 cc of fluid are lost in such standard API test of the slurry at 100° F., and the most preferred slurries lose less than 500 cc under such testing conditions. Since occasionally, the stated limits of fluid loss may not be optimum in the case of some seldom used exotic cement mixtures, another useful measure of the tolerable fluid loss is a loss equivalent to not more than 75% of that value resulting from without the use of a fluid loss additive.

With regard to the described fluid loss desiderata, it will be understood that the standard API fluid loss test conducted in the 325 mesh screen does not simulate several conditions which may exist in the actual borehole. Two of these are:

(1) low permeability formations which are saturated with gas or oil or both. In this case the actual fluid loss from the slurry contained in the borehole may be less than that measured by the standard fluid loss test. As the formation permeability decreases, the rate at which the fluid can be lost can be affected by the formation permeability based on Darcy's radial flow equation, and the effect of the fluid and/or gas contained in the zone; and (2) the mud cake deposited during drilling operations may not be totally removed during the cementing operation, and thus limits filtrate loss from the cement slurry.

It is therefore possible in some cases that satisfactory fluid loss control of the slurry can be achieved by extrinsic conditions existing in the borehole prior to and during the cementing operation. Since these conditions are not completely determinable with certainty, fluid loss additives may be used when in fact the well conditions provide sufficient filtrate limitations. In some wells, based on past experience, it may be known that such conditions do exist, and therefore the control of filtrate loss need not necessarily be provided by the addition of special fluid loss control chemicals.

Any fluid loss mechanism which adequately limits cement filtrate loss in accordance with the criteria described above is suitable for use in the process of the invention, provided it is compatible in the sense hereinbefore defined. Some well known types of fluid loss additives are cellulose derivatives, such as hydroxymethylhydroxyethylcellulose and hydroxyethylcellulose, lignin, ligno-sulfonates, polyacrylamides, modified polysaccharides, polyaromatic sulfonates and guar gum derivatives or mixtures of two or more of the foregoing.

A preferred fluid loss material used in the cement composition is a commercially available blend or mixture of a cellulose derivative or modified polysaccharide with a dispersant constituted by a polymeric aromatic sulfonate. In general, where chemical additives are used to provide the necessary fluid loss reduction, an amount of from about 0.05 to about 3.0 weight percent based on cement used.

The rate of gas generation depends largely upon the particle size, the shape or reactive area of the gas generating composition, the concentration of the gas generating composition, and the temperature, with faster reaction rates occurring as the temperature increases. It has also been found that the gas generating composition can be encapsulated with a compound which will delay the gas generating reaction and thus permit the cement slurry to be circulated through the casing and into the annulus prior to the time that any substantial amount of gas has been generated.

The compound encapsulating the gas generating composition is selected so that it will dissolve or melt at a certain temperature or range of temperatures and allow the reaction of the gas generating composition at a certain temperature or range of temperatures. Compounds suitable for encapsulating the gas generating compositions are well known in the art and include water-soluble waxes and resins which can be blended for a specific melting point such as carbo wax. Further, the reaction rates of gas generating compositions can generally also be affected by the particular additives in the cement slurry. For example, some conventional retarders in fluid loss additives can slow the reaction while calcium chloride or a combination of salt and sodium thiosulfate have been found to accelerate the rate of reaction in many cases.

In order to determine the period and rate of gas generation which is desirable, it is preferable to initially determine, prior to actual placement of the cement, the initial set time of the cement slurry to be gas treated in accordance with the present invention. This can be determined by the analysis of the temperature profile of the slurry. Such tests are preferably conducted with roughly equivalent amounts of gas generating compositions incorporated into the slurry as will be used in the final cement composition to be placed in the annulus since the heat of reaction of the gas generating composition can tend to accelerate the initial set time of the slurry over that which would be characteristic of the neat mixture.

The amount of the nitrogen gas generating material, oxidizing agent, and reaction rate control material which are utilized in the gas generating compositions will vary over a wide range. The material, which is the source of the gas, should be present in an amount sufficient to generate sufficient gas to prevent flow of gas from the formation into the borehole or well annulus. Enough oxidizing agent should be present to cause sufficient generation of the gas. The reaction rate control material will speed up or slow down the generation of gas and therefore the amount of this material is dictated by the particular operation. Based on these broad requirements, the gas generating composition will generally contain about 0.2 to about 5 percent by weight of the nitrogen gas generating material, about 0.2 to about 15 percent by weight of oxidizer, and about 0.2 percent by weight of reaction rate control material.

Various methods can be used to incorporate the gas generating compositions into the cement composition. For instance, the gas generating compositions can be dry mixed into the solid components of the cement prior to addition of the water or a liquid or a mixture containing water and the gas generating composition can be added to the aqueous cement slurry to form a final slurry composition.

As stated earlier, the gas generating compositions of the present invention can take various chemical and physical forms. For instance, the gas generating compositions may be coated or encapsulated with various films which dissolve slowly and allow the gas generating composition to react in a slower manner than by itself.

Based on the foregoing considerations, the amount of gas generating composition that is to be included and the cement slurry will vary over a wide range. The amount of gas to be generated from the gas generating composition can be readily calculated. For instance, one mole of the ingredient which is in the gas generating composition will yield one mole of the nitrogen gas. One mole of nitrogen gas at 20° C. and 14.7 psi equals 24 liters of gas. Since the volume of the slurry and the amount of nitrogen gas can be determined, the percent of gas in the cement slurry at 20° C. and 14.7 psi can be readily determined. The amount of gas will vary based on the pressure at which the cement slurry is utilized, therefore, the amount of gas in the cement slurry can then be recalculated for the specific pressure at which the cement is used.

The cement compositions constituted in accordance with the present invention for use in the process described herein vary greatly, but generally include a hydraulic inorganic cement, water present in the range of from about 20 to about 135 percent by weight of the dry cement, and preferably from about 35 to about 50 percent, a fluid loss material present in an amount in the range of from about 0.05 to about 3.0 percent by weight of dry cement, and a gas generating composition which is present in an amount sufficient to produce from about 0.1 to about 15 percent by volume of a well dispersed gas.

Portland cement is generally preferred because of its low cost, availability, and general utility, but other cement such as pozzolan cements, gypsum cements, and high alumina content cements can be utilized in the invention. Portland cements of API Classes H and G are the most preferred cements for use in the invention in most instances, although the other API classes of cement can also be utilized. The characteristics of the cements are described in API Specification 10-A, which is incorporated herein by reference. A highly useful and effective slurry base composition for use in practicing the invention utilizes API Class H cement mixed with water to provide a density of from 10 to 20 pounds per gallon.

The water used in the cement composition can be water from any source, provided that it should not contain an excess of organic compounds or salts which may affect the stability of the cement composition. The amount of water used to carry out the invention will vary but will generally be present in the range of from about 20 to about 135 percent by weight of dry cement.

Other types of well known and conventional additives can be incorporated into the slurry to modify the properties of the final set cement and to alter the set times and curing times of the slurry. Such additives include viscosifiers, dispersants and weight adjusting materials.

Additional dispersing agents can be utilized to facilitate using lower quantities of water and to promote higher set cement strength. Friction reducers which promote freer movement of the unset composition and allow ease of pumping through the annulus, can be incorporated in the slurry in amounts up to about 2.0 percent by weight of dry cement. Some dual function additives, such as ligno-sulfonates which function both as a dispersant and also as a set time retarder, can be incorporated into the slurry where their use would be advantageous for certain cementing situations.

Accelerators, such as soluble inorganic salts, in addition to calcium chloride, can be utilized up to about 8 percent by weight of dry cement. Retarders, where utilized, are generally used in amounts of from about 0.02 weight percent up to 5.0 percent by weight of dry cement.

Of the various types of fine aggregate or particulate filler materials which can be used, fly ash, silica flour, fine sand, diatomacious earth, lightweight aggregate and hollow spheres can be cited as typical. The use of these materials is well understood in the art, and so long as they are compatible with the stability of the cement compositions of the invention, they can be employed over wide ranges of concentration.

A preferred composition of the invention includes API Class H Portland cement, water in an amount of from about 35 to about 50 percent by weight of cement, a fluid loss material present in an amount of about 1 percent by weight of cement, calcium chloride present up to an amount of 2 percent by weight of cement, and gas generating composition in an amount of from about 0.2 to about 5 weight percent of cement. This composition, is very effective for primary cementing of wells ranging from a depth of about 100 feet to about 20,000 feet. As previously explained, the amount and reactive rate of the gas generating composition employed in the composition will be varied in correspondence to the depth of the well in which the slurry is to be used.

EXAMPLE

In order to further illustrate the present invention, various gas generating compositions used in this practice of the invention were tested. In all examples, expressions of weight percent are based on the weight of the dry cement. The test method used measured directly the slurry compressibility and used pressures and temperatures which simulate actual job conditions. This was accomplished by:

(1) Mixing the base slurry without the gas generators with ice and cold water to provide a 40° to 50° F. slurry temperature.

(2) Adding the gas generating composition and mixing it just enough to disperse.

(3) The mixed slurry was then placed in a stirring autoclave and quickly pressured to the test pressure.

(4) Heat was applied according to API RP 10B testing schedules to simulate job conditions and the temperature is increased until bottom hole circulating temperature is reached and then held constant for the remaining test procedure.

(5) Starting immediately after first applying pressure compressibilty measurements were made at 15 minute intervals.

(6) The compressibility measurements were made by reducing the base test pressure by 10% and recording the amount of the pressurizing fluid withdrawn, then repressurizing to the base pressure and recording the amount of pressurizing fluid injected.

(7) The slurry compressibility was then obtained by subtracting a system correction and dividing by the slurry volume and pressure change.

(8) The amount of gas volume is then calculated from
$TSC = (VGH \times EGC) + [(1 - VGH) \times ISC]$
TSC = Total Slurry Compressibilty (from previous step)
VGH = Volume of Gas at High pressure per unit volume of slurry
ISC = Initial Slurry Compressibilty before gas generation reaction
EGC = Effective Gas Compressibility at and for $P_1-P_2$ at test temperatures calculated from standard PV Tables.

(9) The VGH Volume is converted to standard conditions and the moles of gas is calculated and converted to the equivalent amount of gas generator reacted. The results of these tests are shown in Table I.

TABLE I

| | Gas Generating Composition | | | | | | | | Maximum Gas Detected | | Time 90% |
|---|---|---|---|---|---|---|---|---|---|---|---|
| Test No. | Nitrogen Gas Generating Material | Weight (%) | Oxidizing Agent | Weight (%) | Reaction Rate Control Material | Weight (%) | Test Temp. (F.°) | Test Pressure (PSI) | Initial Detection of Gas (Minutes) | % by volume (Stoichiometric) | Time (Minutes) | by Volume Maximum Gas (Minutes) |
| 1 | Ammonium Sulfate | 0.800 | $H_2O_2$ | 4.50 | Copper Sulfate | 0.20 | 120 | 2000 | 30 | 104.0 | 75 | 40 |
| 2 | Azodicarbonamide | 1.740 | $CaO_2$ | 0.54 | Copper Sulfate | 0.20 | 120 | 2000 | 15–30 | 57.0 | 175 | — |
| 3 | Azodicarbonamide | 1.740 | Sodium Peroxyborate Tetrahydrate | 4.00 | Copper Sulfate | 0.20 | 120 | 2000 | 15–30 | 58.0 | 90 | 75 |
| 4 | Azodicarbonamide | 1.740 | $H_2O_2$ | 1.50 | Copper Sulfate | 0.20 | 120 | 2000 | 30–45 | 78.5 | 90 | 75 |
| 5 | Ammonium Nitrate | 1.200 | $H_2O_2$ | 4.50 | Copper Sulfate | 0.05 | 144 | 8000 | <15 | 58.0 | 60 | 60 |
| 6 | Carbazide | 0.675 | $ZnO_2$ | 1.60 | Copper Sulfate | 0.10 | 120 | 2000 | 45 | 33.0 | 180 | 120 |
| 7 | Carbazide | 2.030 | Sodium Peroxyborate Tetrahydrate | 14.40 | Copper Sulfate | 0.10 | 144 | 8000 | 30 | 74.3 | 180 | 60 |
| 8 | Ammonium Nitrate | 1.200 | Sodium Peroxyborate Tetrahydrate | 4.80 | Copper Sulfate | 0.20 | 120 | 2000 | 45 | 109.0 | 120 | 105 |
| 9 | Ammonium Sulfate | 0.800 | Sodium Peroxyborate Tetrahydrate | 4.80 | Copper Sulfate | 0.20 | 120 | 2000 | 30–45 | 64.0 | 90 | 75 |
| 10 | Carbazide | 0.675 | $H_2O_2$ | 1.02 | Calcium Sulfate Hemihydrate | 2.20 | 120 | 2000 | 30–45 | 64.0 | 255 | 200 |
| 11 | Carbazide | 0.675 | $H_2O_2$ | 1.02 | Sodium Sulfate | 2.30 | 120 | 2000 | 45–60 | 76.0 | 240 | 210 |
| 12 | Carbazide | 0.675 | $CaO_2$ | 1.08 | Copper Sulfate | 0.10 | 120 | 2000 | 170 | 21.0 | 340 | — |
| 13 | Hydrazine | 0.480 | $H_2O_2$ | 1.02 | Calcium Sulfate Hemihydrate | 2.22 | 120 | 2000 | 15–30 | 60.0 | 240 | 210 |

TABLE I-continued

| Test No. | Gas Generating Composition — Nitrogen Gas Generating Material | Weight (%) | Oxidizing Agent | Weight (%) | Reaction Rate Control Material | Weight (%) | Test Temp. (F.°) | Test Pressure (PSI) | Initial Detection of Gas (Minutes) | Maximum Gas Detected — % by volume (Stoichiometric) | Time (Minutes) | Time 90% by Volume Maximum Gas (Minutes) |
|---|---|---|---|---|---|---|---|---|---|---|---|---|
| 14 | Hydrazine | 0.480 | H₂O₂ | 1.02 | Sodium Sulfate | 2.30 | 120 | 2000 | 60–75 | 52.0 | 345 | 345 |
| 15 | Hydrazine Sulfate | 1.950 | Chromic Acid | 2.00 | Calcium Hydroxide | 1.50 | 120 | 2000 | 10–15 | 47.0 | 315 | 180 |
| 16 | Hydroxylamine Sulfate | 2.50 | H₂O₂ | 1.02 | Copper Sulfate | 0.20 | 120 | 2000 | <5 | 72.0 | 180 | 60 |
| 17 | Carbamide | 0.90 | Sodium Peroxyborate Tetrahydrate | 4.80 | Copper Sulfate | 0.20 | 120 | 2000 | 270 | 19.0* | 330* | ND* |
| 18 | Carbamide | 0.90 | H₂O₂ | 1.02 | Copper Sulfate | 0.20 | 120 | 2000 | 105–120 | 40.0* | 180* | 165* |

*Reaction still in progress when test was terminated.

Although certain preferred embodiments of the invention have been herein described for illustrative purposes, it will be appreciated that various modifications and innovations of the procedures recited may be effected without departure from the principals which underlie the invention. Changes of this type are therefore deemed to be within the spirit and scope of the invention except as may be necessarily limited by the amended claims or reasonable equivalents thereof.

What is claimed is:

1. A cement composition for cementing an oil or gas well comprising
(a) a hydraulic cement;
(b) water;
(c) a gas generating composition selected from the group consisting of:
I. a nitrogen gas generating material selected from the group consisting of hydrazine, hydrazine sulfate, carbazide, and mixtures thereof;
an oxidizing agent selected from the group consisting of hydrogen peroxide, sodium peroxyborate tetrahydrate, sodium peroxyborate monohydrate, potassium dichromate, and mixtures thereof; and
a reaction rate control material selected from the group consisting of sodium sulfate, calcium sulfate hemihydrate, copper sulfate hemihydrate, copper sulfate, calcium hydroxide, and mixtures thereof;
II. a nitrogen gas generating material selected from the group consisting of hydrazine, hydrazine sulfate, carbazide, and mixtures thereof;
an oxidizing agent selected from the group consisting of calcium peroxide, zinc peroxide, and mixtures thereof; and,
a reaction rate control material comprising copper sulfate;
III. a nitrogen gas generating material selected from the group consisting of an ammonium salt of an organic or inorganic acid, hydroxylamine sulfate, carbamide, azodicarbonamide, and mixtures thereof;
an oxidizing agent selected from the group consisting of hydrogen peroxide, sodium peroxyborate tetrahydrate, sodium peroxyborate monohydrate, and mixtures thereof;
a reaction rate control material comprising copper sulfate; and,
IV. a nitrogen gas generating material comprising azodicarbonamide;
an oxidizing agent comprising calcium peroxide; and,
a reaction rate control material comprising copper sulfate; and,
V. mixtures of I, II, III, or IV.

2. The composition recited in claim 1 further comprising a fluid loss additive.

3. The composition recited in claim 1 wherein said material is the ammonium salt of organic and inorganic acids.

4. The composition recited in claim 1 wherein said nitrogen gas generating material is selected from the group consisting of ammonium nitrate, ammonium sulfate, ammonium chloride, azodicarbonamide, and mixtures thereof.

5. The composition recited in claim 1 wherein said oxidizing agent is sodium peroxyborate monohydrate.

6. The composition recited in claim 1 wherein said reaction rate control material is selected from the group consisting of sodium sulfate, copper sulfate, and mixtures thereof.

7. The composition recited in claim 2 wherein said fluid loss additive is selected from the group consisting of modified polysaccharides, polymerized aromatic sulfonates, and mixtures thereof.

8. The composition recited in claim 1 wherein said gas generating composition is encapsulated with a compound which delays the gas generation reaction.

9. The composition recited in claim 1 wherein said gas generating composition is present in an amount effective for generating a stable volume of gas sufficient to increase the compressibility of the cement composition under downhole conditions by at least 25% in relation to the initial compressiblity of the cement composition.

10. A gas generating composition selected from the group consisting of:
I. a nitrogen gas generating material selected from the group consisting of hydrazine, hydrazine sulfate, carbazide, and mixtures thereof;
an oxidizing agent selected from the group consisting of hydrogen peroxide, sodium peroxyborate tetrahydrate, sodium peroxyborate monohydrate, potassium dichromate, and mixtures thereof; and a reaction rate control material selected from the group consisting of sodium sulfate, calcium sulfate hemihydrate, copper sulfate hemihydrate, copper sulfate, calcium hydroxide, and mixtures thereof;

II. a nitrogen gas generating material selected from the group consisting of hydrazine, hydrazine sulfate, carbazide, and mixtures thereof;
an oxidizing agent selected from the group consisting of calcium peroxide, zinc peroxide, and mixtures thereof; and,
a reaction rate control material comprising copper sulfate;

III. a nitrogen gas generating material selected from the group consisting of an ammonium salt of an organic or inorganic acid, hydroxylamine sulfate, carbamide, azodicarbonamide, and mixtures thereof;
an oxidizing agent selected from the group consisting of hydrogen peroxide, sodium peroxyborate tetrahydrate, sodium peroxyborate monohydrate, and mixtures thereof;
a reaction rate control material comprising copper sulfate; and, IV. a nitrogen gas generating material comprising azodicarbonamide;
an oxidizing agent comprising calcium peroxide; and,
a reaction rate control material comprising copper sulfate; and, V. mixtures of I, II, III, or IV.

11. The compound recited in claim 10 wherein said oxidizing agent is sodium peroxyborate monohydrate.

12. The compound recited in claim 10 wherein said reaction rate control material is copper sulfate.

13. A method of cementing in an annulus between a well casing and a borehole comprising placing in said annulus a cement composition comprising a hydraulic cement, water, and a gas generating composition said gas generating composition selected from:

I. a nitrogen gas generating material selected from the group consisting of hydrazine, hydrazine sulfate, carbazide, and mixtures thereof;
an oxidizing agent selected from the group consisting of hydrogen peroxide, sodium peroxyborate tetrahydrate, sodium peroxyborate monohydrate, potassium dichromate, and mixtures thereof; and
a reaction rate control material selected from the group consisting of sodium sulfate, calcium sulfate hemihydrate, copper sulfate hemihydrate, copper sulfate, calcium hydroxide, and mixtures thereof;

II. a nitrogen gas generating material selected from the group consisting of hydrazine, hydrazine sulfate, carbazide, and mixtures thereof;
an oxidizing agent selected from the group consisting of calcium peroxide, zinc peroxide, and mixtures thereof; and,
a reaction rate control material comprising copper sulfate;

III. a nitrogen gas generating material selected from the group consisting of an ammonium salt of an organic or inorganic acid, hydroxylamine sulfate, carbamide, azodicarbonamide, and mixtures thereof;
an oxidizing agent selected from the group consisting of hydrogen peroxide, sodium peroxyborate tetrahydrate, sodium peroxyborate monohydrate, and mixtures thereof;
a reaction rate control material comprising copper sulfate; and, IV. a nitrogen gas generating material comprising azodicarbonamide;
an oxidizing agent comprising calcium peroxide; and,
a reaction rate control material comprising copper sulfate; and, V. mixtures of I, II, III, or IV.

14. The method recited in claim 13 wherein said cement composition further comprises a fluid loss additive.

15. The method recited in claim 13 wherein said gas generating composition is present in an amount effective for generating a stable volume of gas sufficient to increase the compressibility of the cement composition under downhole conditions by at least 25% in relation to the initial compressiblity of the cement composition.

16. The method recited in claim 13 wherein said gas generating composition is encapsulated with a compound which delays the gas generation reaction.

17. The method recited in claim 13 wherein said nitrogen gas generating material is the ammonium salt of organic and inorganic acids.

18. The method recited in claim 13 wherein said nitrogen gas generating material is azodicarbonamide.

19. The method recited in claim 18 wherein said oxidizing agent is sodium peroxyborate tetrahydrate.

20. The method recited in claim 19 wherein said reaction rate control material is copper sulfate.

* * * * *